United States Patent
Heaston et al.

(10) Patent No.: US 10,075,787 B1
(45) Date of Patent: Sep. 11, 2018

(54) PORTABLE LOUDSPEAKER

(71) Applicant: Bose Corporation, Framingham, MA (US)

(72) Inventors: Jeremy Heaston, Ashland, MA (US); Seth Mann, North Reading, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/645,408

(22) Filed: Jul. 10, 2017

(51) Int. Cl.
*H04R 1/28* (2006.01)
*H04R 1/02* (2006.01)
*G06F 3/16* (2006.01)

(52) U.S. Cl.
CPC ............ *H04R 1/288* (2013.01); *G06F 3/165* (2013.01); *H04R 1/025* (2013.01); *H04R 1/2834* (2013.01)

(58) Field of Classification Search
CPC ...... H04R 1/288; H04R 1/025; H04R 1/2834; G06F 3/165
See application file for complete search history.

(56) References Cited

U.S. PATENT DOCUMENTS

| 2014/0072147 | A1* | 3/2014 | Su ........................ H01H 13/50 381/123 |
| 2016/0173673 | A1* | 6/2016 | Hyun .................. H04M 1/236 455/566 |
| 2017/0083054 | A1* | 3/2017 | Wang .................... G06F 1/169 |

* cited by examiner

*Primary Examiner* — Sonia Gay
(74) *Attorney, Agent, or Firm* — Brian M. Dingman; Dingman IP Law, PC

(57) ABSTRACT

A portable loudspeaker with an enclosure that defines an acoustic cavity in an interior of the enclosure, at least one passive radiator exposed to the acoustic cavity, and an electro-acoustic transducer arranged to radiate sound pressure into the acoustic cavity to acoustically energize the at least one passive radiator. A user-operable switch is located in the interior of the enclosure, and a compliant button that forms part of the enclosure and overlies and is spaced from the switch. A sound-deadening member is positioned in the space between the button and the switch. The sound-deadening member is arranged to inhibit sound pressure in the acoustic cavity from reaching the button.

25 Claims, 4 Drawing Sheets

FIG. 2B

PORTABLE LOUDSPEAKER

BACKGROUND

This disclosure relates to portable loudspeakers.

Some portable loudspeakers (also known as speaker packages) use one or more passive radiators that are energized by sound pressure created in an internal cavity by an electro-acoustic transducer. Some such loudspeakers also have elastomeric buttons on the outside, used to control functions such as power and volume. Given the compliant nature of the elastomer and the location of the buttons on the enclosure, pressure changes in the acoustic cavity that are attributable to sound production by the electro-acoustic transducer can cause the buttons to vibrate. As a result, the buttons themselves can operate as small passive radiators which contribute undesirable sound to the output of the speaker package.

SUMMARY

All examples and features mentioned below can be combined in any technically possible way.

In one aspect, a portable loudspeaker includes an enclosure that defines an acoustic cavity in an interior of the enclosure, and an electro-acoustic transducer arranged to radiate sound pressure into the acoustic cavity. A user-operable switch is located in the interior of the enclosure, and a compliant button forms part of the enclosure and overlies and is spaced from the switch. A sound-deadening member is positioned in the space between the button and the switch. The sound-deadening member is arranged to inhibit sound pressure in the acoustic cavity from reaching the button.

Embodiments may include one of the following features, or any combination thereof. The sound-deadening member may comprise open-cell foam. The sound-deadening member may have an initial thickness of open-cell foam, and the open-cell foam may be compressed. The open-cell foam may be compressed to less than about 60% of its initial thickness. The sound-deadening member may span the entire space between the button and the switch. The sound-deadening member may comprise an opening that allows the button to be displaced, to contact and operate the switch.

Embodiments may include one of the following features, or any combination thereof. The portable loudspeaker may further comprise a region of a thin elastomeric material that has a perimeter, wherein the button is defined by the region of thin elastomeric material. The sound-deadening member may define an outer wall that surrounds the perimeter of the region of thin elastomeric material. There may be a plurality of compliant buttons defined by the region of thin elastomeric material, and an equal plurality of user-operable switches located in the interior of the enclosure, and the sound-deadening member may comprise a plurality of openings, each opening located between one button and one switch, and allowing the button to be displaced, to contact and operate the switch. The region of thin elastomeric material may be coupled to the enclosure so as to form an air-tight seal therebetween.

Embodiments may include one of the following features, or any combination thereof. The switch may be located on a surface of a printed circuit board, and the sound-deadening member may span the entire space between the surface of the printed circuit board and the button. The portable loudspeaker may further comprise a region of a thin elastomeric material that has a perimeter, wherein the button is defined by the region of thin elastomeric material. The sound-deadening member may define an outer wall that surrounds the perimeter of the region of thin elastomeric material. The portable loudspeaker may comprise a plurality of compliant buttons defined by the region of thin elastomeric material, and an equal plurality of user-operable switches located in the interior of the enclosure, and the sound-deadening member may comprise a plurality of openings, each opening located between one button and one switch, and allowing the button to be displaced, to contact and operate the switch. The sound-deadening member may comprise open-cell foam with an initial thickness that is greater than the space between the surface of the printed circuit board and the buttons, and the open-cell foam may be compressed and span the entire space between the surface of the printed circuit board and the buttons.

Embodiments may include one of the following features, or any combination thereof. The sound-deadening member may prevent sound pressure in the acoustic cavity from reaching the button. The sound-deadening member may absorb acoustic energy so as to inhibit sound pressure in the acoustic cavity from reaching the button. The sound-deadening member may comprise a gasket that spans the entire space between the button and the switch. The sound-deadening member may comprise a pliable material that fills the entire space between the button and the switch. The portable loudspeaker may further comprise at least one passive radiator exposed to the acoustic cavity, wherein the electro-acoustic transducer is arranged to radiate sound pressure into the acoustic cavity to acoustically energize the at least one passive radiator. The at least one passive radiator may comprise a pair of opposed passive radiators that are both energized by sound pressure from the electro-acoustic transducer. The portable loudspeaker may further comprise a compliant skin overlying and abutting the compliant button.

In another aspect, a portable loudspeaker includes an enclosure that defines an acoustic cavity in an interior of the enclosure, an electro-acoustic transducer arranged to radiate sound pressure into the acoustic cavity, a printed circuit board disposed within the acoustic cavity, a plurality of user-operable switches mounted on the surface of the printed circuit board, a region of a thin elastomeric material that has a perimeter and that forms part of the enclosure and overlies and is spaced from the switches, wherein an equal plurality of compliant buttons are defined by the region of thin elastomeric material, and a compliant sound-deadening member comprising compressed foam and spanning the entire space between the switches and the buttons, where the sound-deadening member defines an outer wall that surrounds the perimeter of the region of thin elastomeric material, and is arranged to inhibit sound pressure in the acoustic cavity from reaching the button.

Embodiments may include one of the above and/or below features, or any combination thereof. The sound-deadening member may span the entire space between the surface of the printed circuit board and the buttons, and the sound-deadening member may comprise a plurality of openings, each opening located between one button and one switch, and allowing the button to be displaced so as to contact and operate the switch. The portable loudspeaker may further comprise at least one passive radiator exposed to the acoustic cavity, wherein the electro-acoustic transducer is arranged to radiate sound pressure into the acoustic cavity to acoustically energize the at least one passive radiator.

BRIEF DESCRIPTION OF THE DRAWINGS

FIGS. 2A and 2B are front and rear exploded perspective views, respectively, of a portable loudspeaker.

DETAILED DESCRIPTION

Figure 1:
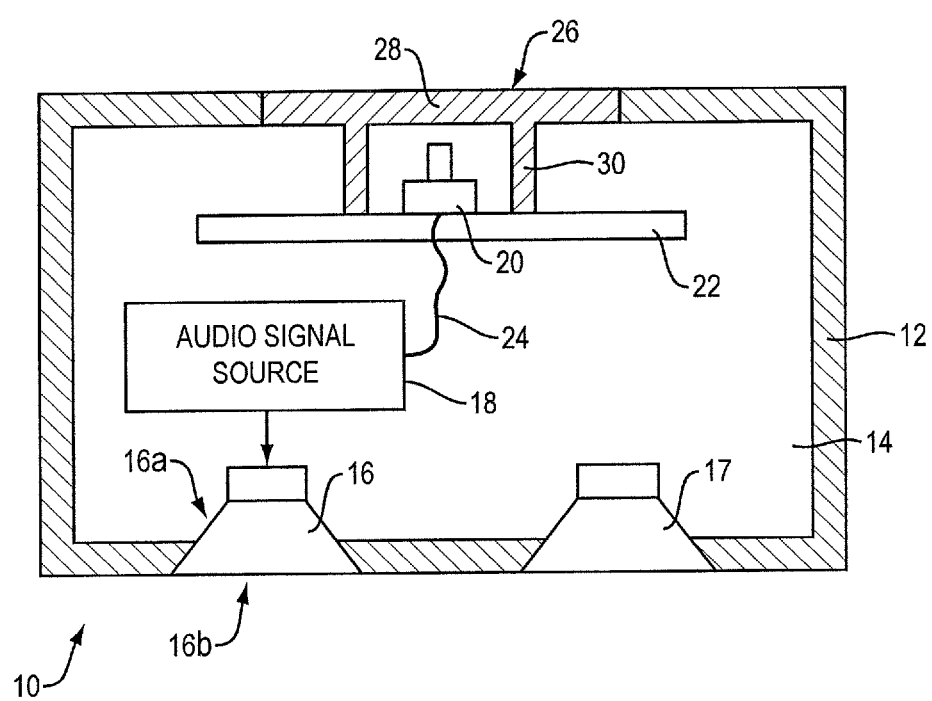
FIG. 1 is cross-sectional diagram of a portable loudspeaker.

A portable loudspeaker can have an enclosure that defines an acoustic cavity in an interior of the enclosure, and an electro-acoustic transducer arranged to radiate sound pressure into the acoustic cavity; the transducer may also radiate sound outwardly from the enclosure. Some portable loudspeakers also include one or more passive radiators exposed to the acoustic cavity. Some portable loudspeakers have sealed enclosures. Some loudspeakers have a ported enclosure. The interior sound pressure level (SPL) acoustically energizes the passive radiator(s). The portable loudspeaker also has a user-operable switch (e.g., a power switch, and/or a volume control switch) located in the interior of the enclosure, just below an exterior enclosure wall. A compliant button may be formed in the exterior enclosure wall. The button overlies and is spaced from the switch, but is close enough so that the button can be pushed down in order to operate the switch. In accordance with the present disclosure, a sound-deadening member is positioned between the button and the switch, but arranged such that the button can still be pressed in so as to operate the switch. The sound-deadening member is arranged to inhibit sound pressure in the acoustic cavity from reaching the button: the varying SPL in the cavity might otherwise cause the button to flex in and out and thus radiate unwanted sound from the enclosure. The sound-deadening member thus inhibits or prevents the button from acting as a small passive radiator and generating unwanted noise or buzzing sounds.

In one example, the portable loudspeaker includes an enclosure which defines an acoustic cavity. The enclosure supports first and second passive radiators, which are arranged on opposite sides of the acoustic cavity. An electro-acoustic transducer is coupled to the enclosure and is arranged such that acoustic energy radiated from the electro-acoustic transducer acoustically energizes the first and second passive radiators. The enclosure consists primarily of a hard-plastic shell with a small region of elastomer. The elastomer is formed to the hard-plastic shell so as to create an air-tight seal at the junction therebetween. The elastomer defines a plurality of buttons which the user can press to control features such as volume and power. The buttons overly respective switches which are mounted on a printed circuit board (PCB). The PCB resides within the acoustic cavity.

Given the compliant nature of the elastomer and the location of the buttons on the enclosure, pressure changes in the acoustic cavity that are attributable to the operation of the electro-acoustic transducer can cause the buttons to vibrate. As a result, the buttons themselves can operate as small passive radiators which contribute undesirable sound to the output of the speaker package.

To help alleviate this problem, a sound-deadening member (e.g., an acoustically-absorbent foam material) is incorporated in the acoustic cavity, to isolate the rear surfaces of the buttons from the acoustic energy generated by the acoustic transducer. The sound-deadening member can be positioned between a top surface of the PCB on which the switches are mounted, and the inner surface of the enclosure in a region beneath the buttons. The sound-deadening member can define an outer wall that surrounds the perimeter of the region of elastomer on the enclosure, and one or more openings directly below the buttons that allow the buttons to be displaced to actuate the underlying switches.

When the sound-deadening member is made from an open-cell foam, it can achieve the acoustic isolation best if it is compressed down to a point where it behaves similar to a closed-cell foam, or by compressing it enough to form a torturous resistance path so that the buttons are not affected by the varying SPL in the acoustic cavity. When the sound-deadening member is made from a closed-cell foam or another material that is not open, it may not need to be compressed.

The sound-deadening member inhibits or prevents excitation of elastomeric buttons that would otherwise result from normal operation of the electro-acoustic transducer. It also reduces undesirable audio artifacts attributable to vibration of compliant buttons on the surface of an acoustic enclosure.

FIG. 1 is cross-sectional diagram of portable loudspeaker 10. Portable loudspeaker 10 comprises enclosure 12 that defines an internal acoustic cavity 14. Electro-acoustic transducer 16 is arranged to radiate sound pressure into acoustic cavity 14. In the present non-limiting example, transducer 16 radiates sound from its rear side 16a into acoustic cavity 14, and also radiates sound from its front side 16b outward from enclosure 12. However, transducer 16 could in an alternative example only radiate into the acoustic cavity. Audio signal source 18 provides analog audio signals that are used to drive transducer 16. Portable loudspeaker 10 also comprises passive radiator 17, which is arranged to be driven by the varying SPL in acoustic cavity 14 and thus radiate sound outwardly from enclosure 12. Passive radiator 17 is effective to increase the amount of sound pressure radiated from enclosure 12 over what is radiated by transducer 16 alone. Passive radiators are well known in the field and so will not be further described herein.

Portable loudspeaker 10 also comprises user-operable switch 20 located in the interior of enclosure 12. Switch 20 may be used to accomplish user control of a loudspeaker function, such as on/off or volume + or volume −, as three non-limiting examples. Loudspeaker 10 could include more than one user-operable switch. Switch 20 is mounted to printed circuit board (PCB) 22. Compliant member or button 26 forms part of enclosure 12. Button 26 overlies and is spaced from switch 20. Area 28 of button 26 has enough compliance such that it can be pushed down (like a button) far enough to operate switch 20. In one non-limiting example button 26 is made from an elastomer. Given the compliant nature of button 26 and its location on the enclosure where it is fluidly and thus acoustically coupled to the varying SPL in acoustic cavity 14, pressure changes in acoustic cavity 14, attributable to the operation of electro-acoustic transducer 16, can cause button 26 to vibrate. As a result, button 26 can operate essentially as small passive radiator, and contribute undesirable sound to the output of loudspeaker 10.

Sound-deadening member 30 is positioned between button 26 and switch 20. Sound-deadening member 30 is arranged to inhibit sound pressure in acoustic cavity 14 from reaching button 26, most particularly any compliant portion of button 26 such as area 28. With less sound pressure reaching button 26, it vibrates less, and so contributes less to unwanted sound output from loudspeaker 10. In this non-limiting example, sound-deadening member 30 comprises a gasket or other structure that spans the space between the top of PCB 22 to which switch 20 is mounted and the inside (or bottom) of button 26. Sound-deadening member 30 is illustrated in FIG. 1 as a round (cylindrical) gasket that may (or may not) be an integral part of button 26. However, sound-deadening member 30 can take many other forms, and may be made of materials other than elastomers.

A function of the sound-deadening member 30 is to inhibit or prevent pressure variations in acoustic cavity 14 from reaching the compliant portion 28 of button 26. This function can be accomplished by diverse types of separate or integral members. The sound-deadening member 30 should surround switch 20 and either absorb or block pressure fluctuations that would otherwise reach the compliant button. Sound-deadening member 30 should also define or otherwise be arranged so as to leave an opening that allows the button to be displaced sufficiently to contact and operate the underlying switch. The sound-deadening member could be arranged to allow for button displacement other than via an opening, for example with a foam portion underlying the switch that is sufficiently compliant to allow button displacement.

Sound-deadening member 30 could be made from a foam, either open-cell or closed-cell. If the foam is open-cell, it can be compressed sufficiently such that it is effective either to absorb the sound energy or create a torturous resistance path that is effective to fully or sufficiently inhibit sound pressure from reaching the underside of compliant button portion 28. In one non-limiting example, sound-deadening member 30 is made from an open-cell polyurethane foam that is compressed to less than about 60% of its original thickness. Sound-deadening member 30 could alternatively be accomplished with a pliable material that spans the distance from PCB 22 to button portion 28. One non-limiting example of a pliable material is RTV or another putty-like substance that hardens enough to maintain its shape and position sufficiently so as to inhibit or prevent pressure variations in acoustic cavity 14 from reaching the compliant portion 28 of button 26. Additional examples of the sound-deadening member are described below.

Figure 2A:
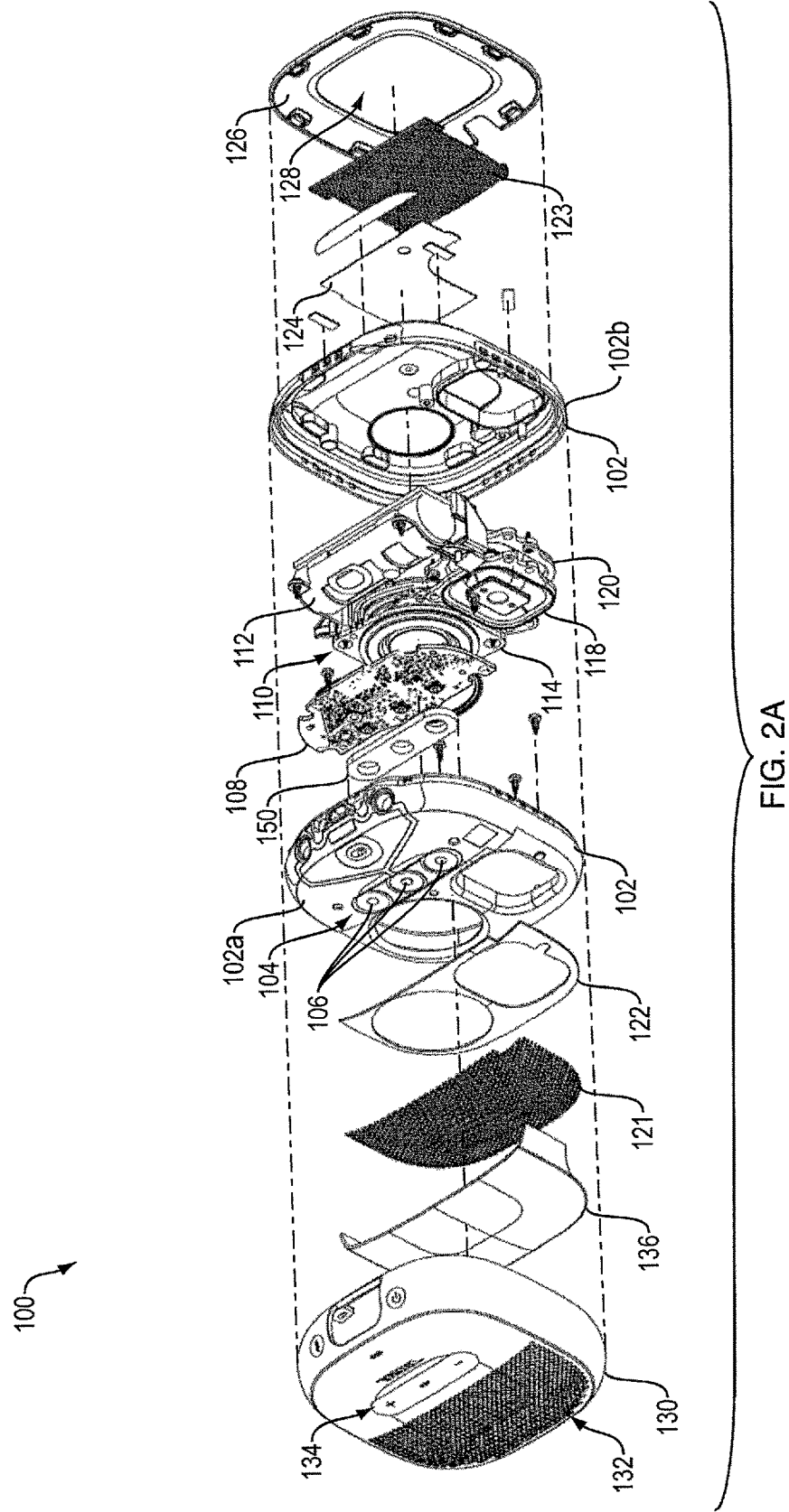
Figure 2B:
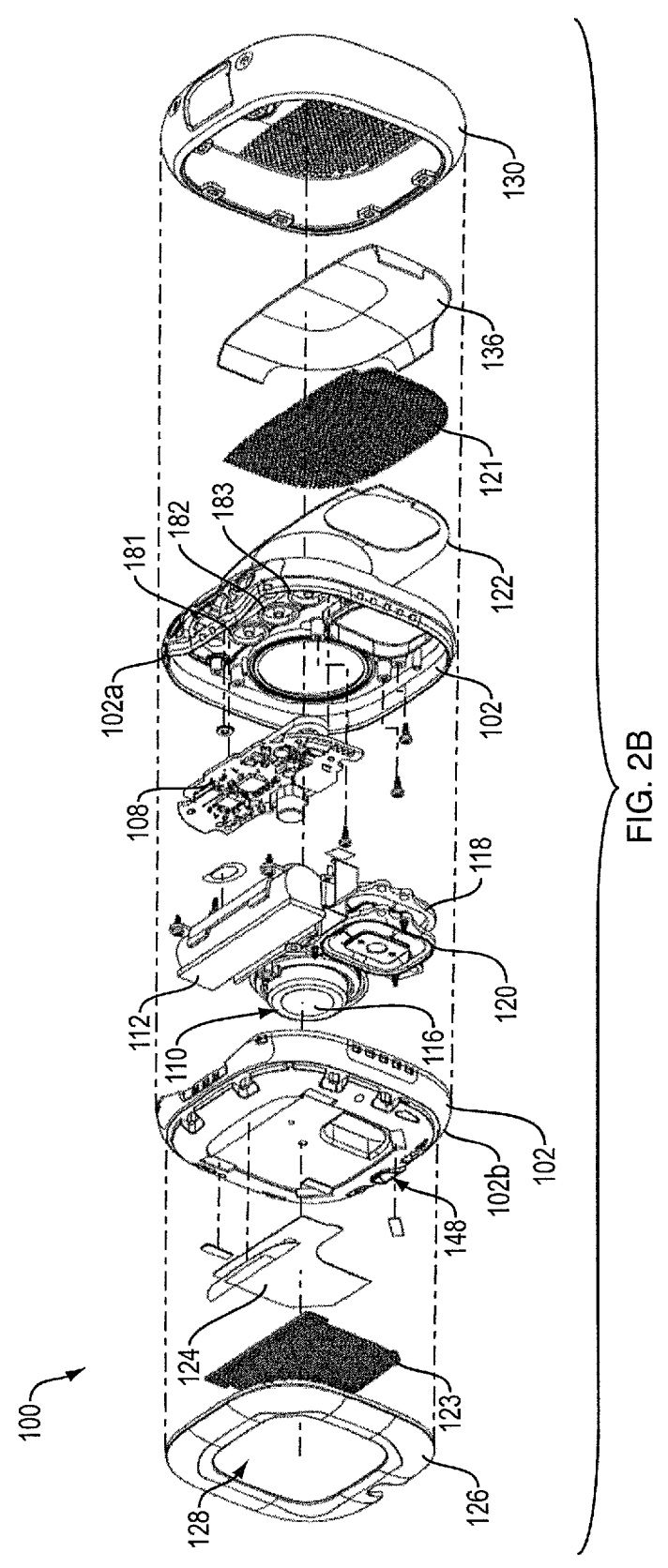

Referring to FIGS. 2A and 2B, a specific, non-limiting example of a portable loudspeaker 100 includes an enclosure 102 having a first enclosure portion 102a and a second enclosure portion 102b, which are coupled together and define an acoustic cavity in the volume between them. The first and second enclosure portions consist primarily of a hard, plastic shell. The first enclosure portion 102a includes a small region of elastomer 104, which is formed to the hard, plastic shell to create an air tight seal at the junction therebetween (e.g., by insert molding or two-shot molding). Thin elastomer region 104 defines a plurality of buttons 106 which the user can press to control features such as volume and power. The buttons 106 overly respective switches which are mounted on a printed circuit board (PCB) 108. Rings 181, 182, and 183 surround buttons 106, and are involved in sealing the buttons from the SPL in the acoustic cavity, as further explained below in conjunction with FIG. 3.

The PCB 108 resides within the acoustic cavity. The PCB 108 can support various electronics for the loudspeaker 100 such as a wireless receiver (e.g., Bluetooth receiver) for receiving streamed audio signals, one or more digital signal processors (DSPs) for processing digital audio streams, and one or more digital-to-analog converters for converting digital audio streams to analog form for the transduction by electro-acoustic transducer 110. A battery 112 is also enclosed within the acoustic cavity for powering the electronics and the electro-acoustic transducer 110.

A frame 114 along a first side of the electro-acoustic transducer 110 is secured to the first enclosure portion 102a, e.g., via fasteners. A second, opposite side of the electro-acoustic transducer 110 (e.g., a motor structure 116 of the transducer) is secured to the second enclosure portion 102b, e.g., using an adhesive, such that the electro-acoustic transducer 110 is sandwiched between and fixedly coupled to both the first and second enclosure portions 102a, 102b. The electro-acoustic transducer 110 is arranged such that its motion axis is substantially perpendicular to the front and rear surfaces of the enclosure 102. This coupling of the opposing sides of the electro-acoustic transducer 110 to the enclosure 102 changes the rocking mode of the electro-acoustic transducer 110 and can help to push the rocking mode up to higher frequencies.

The electro-acoustic transducer 110 resides within the acoustic cavity and is arranged such that acoustic energy radiated from the electro-acoustic transducer 110 acoustically energizes a pair of passive radiators (i.e., first and second passive radiators 118, 120). Each of the first and second passive radiators 118, 120 is mounted, e.g., via fasteners (e.g., screws), to a corresponding one of the first and second enclosure portions 102a, 102b. The first and second passive radiators 118, 120 are driven with parallel and preferably coaxial, directions of motion which are acoustically in phase with each other and mechanically out of phase with each other. Using two passive radiators within a single enclosure can be advantageous because the inertial forces associated with passive radiators may be made to cancel, and the size of each individual passive radiator may be made smaller. This is especially advantageous for small, highly portable speaker packages, since the surface area of the enclosure of such speaker packages may not be large enough to accommodate a single passive radiator with the same effective radiating area of the two passive radiators 118 and 120 together.

A first speaker grille 121 is mounted to an outer surface of the first enclosure portion 102a (the front surface of the enclosure) via a double-sided foam tape 122. The foam helps take up the tolerances between the first speaker grille 121 and the enclosure 102. A second speaker grille 123 is supported along an outer surface of the second enclosure portion 102b (the rear surface of the enclosure). A piece of flocking material 124 is provided between the second speaker grille 123 and the enclosure 102. The flocking material 124 is a thin, felt-like material with an adhesive backing, which helps to prevent the second speaker grille 123 from buzzing (vibrating) against the enclosure 102. In some cases, the first and second speaker grilles 121, 123 are made of thin steel and include micro-perforations for acoustic transparency.

A back cover 126 (a/k/a "foot") is mounted to the rear surface of the enclosure 102 and surrounds the second speaker grille 123. An opening 128 is provided in the back cover 126 so that the second speaker grille 123 remains exposed. A boot 130 covers the front surface and sides of the enclosure 102. The boot 130 includes a perforated region 132 that overlies the first speaker grille 121 and allows for acoustic energy to pass therethrough. The boot 130 also includes a button region 134 that overlies the buttons 106 on the first enclosure portion 102a. The boot 130 may be formed of an elastomer or rubber. An open cell foam member 136 is provided between the first speaker grille 121 and the boot 130 to prevent the boot 130 from buzzing against the first speaker grille 121.

Sound-deadening member 150 in this non-limiting example is an open-cell foam member that has a perimeter shape that matches the perimeter shape of elastomer region 104 that defines the buttons, so that member 150 underlies all of region 104. Member 150 has three openings, one associated with each button and underlying switch. The openings allow the button to be depressed sufficiently to operate the underlying switch. The foam of member 150 is preferably but not necessarily compressed, such that it is effective to act as a barrier to acoustic cavity SPL variations reaching the undersides of the buttons. Member 150 thus inhibits or prevents the buttons from vibrating in and out so as to create sound that can be heard by the user. In one non-limiting example, the distance between the top of PCB 108 and the bottom of elastomer region 104 is approximately 1.58 mm and member 150 has an un-compressed thickness of about 3 mm, thus member 150 is compressed by at least about 40%, and in this case by almost 50%. When the speaker package includes an overlying soft boot as in the example depicted in FIGS. 2A and 2B, button vibration can cause a buzzing sound of the button contacting the boot. The sound-deadening accomplished by member 150 is also effective to inhibit or prevent any such buzzing.

Figure 3:
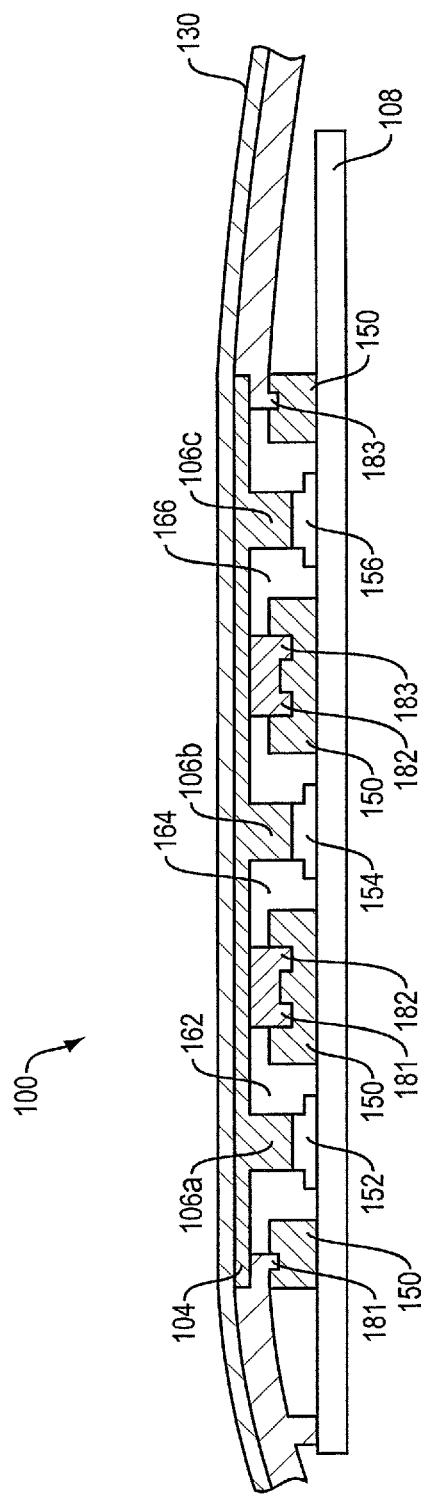
FIG. 3 is a partial cross-sectional diagram of a portable loudspeaker.

FIG. 3 is a partial cross-sectional diagram of the portable loudspeaker 100, providing more detail of the arrangement of buttons 106a, 106b, and 106c, that are defined by elastomer member 104, and openings 162, 164, and 166 in compressed open-cell foam sound-deadening member 150. Underlying switches 152, 154, and 156, which are functionally coupled to PCB 108, are also shown. Rings 181, 182, and 183 are downwardly-projecting portions of the housing that surround each of the buttons. These rings contact and compress open-cell foam member 150 so that member 150 is effective to inhibit or prevent SPL in the acoustic cavity from entering openings 162, 164, and 166. This prevents SPL from reaching the undersides of buttons 106a, 106b, and 106c. The buttons thus are not moved in and out by the SPL and so do not radiate sound outwardly. Also, the buttons do not buzz against overlying elastomeric compliant skin or boot 130. Sound-deadening member thus is effective to quiet any unwanted noise from the buttons.

A number of implementations have been described. Nevertheless, it will be understood that additional modifications may be made without departing from the scope of the inventive concepts described herein, and, accordingly, other embodiments are within the scope of the following claims.

What is claimed is:

1. A portable loudspeaker, comprising:
an enclosure that defines an acoustic cavity in an interior of the enclosure;
an electro-acoustic transducer arranged to radiate sound pressure into the acoustic cavity;
a user-operable switch located in the interior of the enclosure;
a compliant button that forms part of the enclosure and overlies and is spaced from the switch; and
a sound-deadening member positioned in the space between the button and the switch and arranged to inhibit sound pressure in the acoustic cavity from reaching the button.

2. The portable loudspeaker of claim 1, wherein the sound-deadening member comprises open-cell foam.

3. The portable loudspeaker of claim 2, wherein the sound-deadening member has an initial thickness of open-cell foam, and the open-cell foam is compressed.

4. The portable loudspeaker of claim 3, wherein the open-cell foam is compressed to less than about 60% of its initial thickness.

5. The portable loudspeaker of claim 1, wherein the sound-deadening member spans the entire space between the button and the switch.

6. The portable loudspeaker of claim 5, wherein the sound-deadening member comprises an opening that allows the button to be displaced, to contact and operate the switch.

7. The portable loudspeaker of claim 1, further comprising a region of a thin elastomeric material that has a perimeter, wherein the button is defined by the region of thin elastomeric material.

8. The portable loudspeaker of claim 7, wherein the sound-deadening member defines an outer wall that surrounds the perimeter of the region of thin elastomeric material.

9. The portable loudspeaker of claim 8, comprising a plurality of compliant buttons defined by the region of thin elastomeric material, and an equal plurality of user-operable switches located in the interior of the enclosure, wherein the sound-deadening member comprises a plurality of openings, each opening located between one button and one switch, and allowing the button to be displaced, to contact and operate the switch.

10. The portable loudspeaker of claim 7, wherein the region of thin elastomeric material is coupled to the enclosure so as to form an air-tight seal therebetween.

11. The portable loudspeaker of claim 1, wherein the switch is located on a surface of a printed circuit board, and the sound-deadening member spans the entire space between the surface of the printed circuit board and the button.

12. The portable loudspeaker of claim 11, further comprising a region of a thin elastomeric material that has a perimeter, wherein the button is defined by the region of thin elastomeric material.

13. The portable loudspeaker of claim 12, wherein the sound-deadening member defines an outer wall that surrounds the perimeter of the region of thin elastomeric material.

14. The portable loudspeaker of claim 13, comprising a plurality of compliant buttons defined by the region of thin elastomeric material, and an equal plurality of user-operable switches located in the interior of the enclosure, wherein the sound-deadening member comprises a plurality of openings, each opening located between one button and one switch, and allowing the button to be displaced, to contact and operate the switch.

15. The portable loudspeaker of claim 14, wherein the sound-deadening member comprises open-cell foam with an initial thickness that is greater than the space between the surface of the printed circuit board and the buttons, and wherein the open-cell foam is compressed and spans the entire space between the surface of the printed circuit board and the buttons.

16. The portable loudspeaker of claim 1, wherein the sound-deadening member prevents sound pressure in the acoustic cavity from reaching the button.

17. The portable loudspeaker of claim 1, wherein the sound-deadening member absorbs acoustic energy so as to inhibit sound pressure in the acoustic cavity from reaching the button.

18. The portable loudspeaker of claim 1, wherein the sound-deadening member comprises a gasket that spans the entire space between the button and the switch.

19. The portable loudspeaker of claim 1, wherein the sound-deadening member comprises a pliable material that fills the entire space between the button and the switch.

20. The portable loudspeaker of claim 1, further comprising at least one passive radiator exposed to the acoustic cavity, wherein the electro-acoustic transducer is arranged to radiate sound pressure into the acoustic cavity to acoustically energize the at least one passive radiator.

21. The portable loudspeaker of claim 20, wherein the at least one passive radiator comprises a pair of opposed passive radiators that are both energized by sound pressure from the electro-acoustic transducer.

22. The portable loudspeaker of claim 1, further comprising a compliant skin overlying and abutting the compliant button.

23. A portable loudspeaker, comprising:
an enclosure that defines an acoustic cavity in an interior of the enclosure;
an electro-acoustic transducer arranged to radiate sound pressure into the acoustic cavity;
a printed circuit board disposed within the acoustic cavity;
a plurality of user-operable switches mounted on the surface of the printed circuit board;
a region of a thin elastomeric material that has a perimeter and that forms part of the enclosure and overlies and is spaced from the switches, wherein an equal plurality of compliant buttons are defined by the region of thin elastomeric material; and
a compliant sound-deadening member comprising compressed foam and spanning the entire space between the switches and the buttons, where the sound-deadening member defines an outer wall that surrounds the perimeter of the region of thin elastomeric material, and is arranged to inhibit sound pressure in the acoustic cavity from reaching the button.

24. The portable loudspeaker of claim 23, wherein the sound-deadening member spans the entire space between the surface of the printed circuit board and the buttons, and wherein the sound-deadening member comprises a plurality of openings, each opening located between one button and one switch, and allowing the button to be displaced so as to contact and operate the switch.

25. The portable loudspeaker of claim 23, further comprising at least one passive radiator exposed to the acoustic cavity, wherein the electro-acoustic transducer is arranged to radiate sound pressure into the acoustic cavity to acoustically energize the at least one passive radiator.

* * * * *